United States Patent
Itonaga et al.

(10) Patent No.: US 9,383,185 B2
(45) Date of Patent: Jul. 5, 2016

(54) SENSOR APPARATUS

(75) Inventors: Masafumi Itonaga, Aichi (JP); Norihiro Ida, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 816 days.

(21) Appl. No.: 13/805,376

(22) PCT Filed: Jun. 13, 2011

(86) PCT No.: PCT/IB2011/001306
§ 371 (c)(1),
(2), (4) Date: Dec. 19, 2012

(87) PCT Pub. No.: WO2011/161509
PCT Pub. Date: Dec. 29, 2011

(65) Prior Publication Data
US 2013/0093413 A1  Apr. 18, 2013

(30) Foreign Application Priority Data
Jun. 25, 2010 (JP) ................. 2010-145400

(51) Int. Cl.
*G01B 7/14* (2006.01)
*F01L 13/00* (2006.01)

(52) U.S. Cl.
CPC .............. *G01B 7/14* (2013.01); *F01L 13/0036* (2013.01); *F01L 13/0042* (2013.01); *F01L 2101/00* (2013.01); *F01L 2820/041* (2013.01)

(58) Field of Classification Search
CPC .... G01B 7/14; F01L 13/0036; F01L 13/0042; F01L 2820/041; F01L 2101/00
See application file for complete search history.

(56) References Cited

U.S. PATENT DOCUMENTS

| 4,667,158 | A | 5/1987 | Redlich |
| 5,497,804 | A | 3/1996 | Codina et al. |
| 5,652,510 | A | 7/1997 | Kyodo |
| 6,415,753 | B1 | 7/2002 | Nagaosa et al. |
| 6,642,710 | B2 | 11/2003 | Morrison et al. |
| 2002/0089326 | A1 | 7/2002 | Morrison et al. |
| 2002/0118012 | A1* | 8/2002 | Gudgeon et al. ........ G01P 3/488 324/207.15 |
| 2002/0148304 | A1* | 10/2002 | Goto et al. ............. G01L 5/221 73/862.08 |
| 2013/0192312 | A1* | 8/2013 | Ius et al. ............... F16F 9/3292 68/12.06 |

FOREIGN PATENT DOCUMENTS

| DE | 4114079 | 11/1992 |
| DE | 19913868 | 7/2000 |
| EP | 1688710 | 8/2006 |

(Continued)

OTHER PUBLICATIONS

International Search Report, mail date is Jan. 11, 2011.
(Continued)

*Primary Examiner* — Patrick Assouad
*Assistant Examiner* — Haidong Zhang
(74) *Attorney, Agent, or Firm* — Greenblum & Bernstein, P.L.C.

(57) ABSTRACT

A sensor apparatus for detecting a position of an axially movable camshaft is provided. The sensor apparatus includes a coil block including a detection coil wound along an axial direction of the camshaft to define a bore into which the camshaft is inserted, and a control unit electrically connected to the detection coil and designed to output a signal based on a change in inductance of the detection coil.

6 Claims, 2 Drawing Sheets

(56) References Cited

FOREIGN PATENT DOCUMENTS

| | | | |
|---|---|---|---|
| IT | WO 2008012651 A2 * | 1/2008 | ............ D06F 37/203 |
| JP | 63-46004 | 2/1988 | |
| JP | 64-42410 | 3/1989 | |
| JP | 2-131608 | 11/1990 | |
| JP | 7-139572 | 5/1995 | |
| JP | 2001-065371 | 3/2001 | |
| JP | 2001-147102 | 5/2001 | |
| JP | 2001-336906 | 12/2001 | |
| JP | 2003-207302 | 7/2003 | |
| WO | 00/65299 | 11/2000 | |

OTHER PUBLICATIONS

China Office action, dated Mar. 23, 2015 along with an English translation thereof.

Search report from E.P.O., mail date is May 8, 2013.

* cited by examiner

# SENSOR APPARATUS

FIELD OF THE INVENTION

The present invention relates to a sensor apparatus.

BACKGROUND OF THE INVENTION

Conventionally, an internal combustion engine such as a gasoline engine is provided with a camshaft for opening and closing valves. There is known a camshaft that can axially move depending on the engine operating condition. As a sensor apparatus for detecting the position of the axially movable camshaft, there is provided a sensor apparatus including a position sensor arranged in an opposing relationship with the outer circumferential surface of a camshaft (see, e.g., JP2001-65371A).

In this sensor apparatus, if the camshaft is misaligned in a radial direction, the distance between the camshaft and the position sensor is deviated from a predetermined design value, thereby generating an error in a position detection signal outputted from the position sensor. As a result, the sensor apparatus of the prior art example mentioned above may possibly be incapable of accurately detecting the axial position of the camshaft if there occurs radial misalignment of the camshaft.

SUMMARY OF THE INVENTION

In view of the above, the present invention provides a sensor apparatus capable of accurately detecting the position of a camshaft by reducing the influence of radial misalignment of the camshaft.

In accordance with an embodiment of the present invention, there is provided a sensor apparatus for detecting a position of an axially movable camshaft, including: a coil block including a detection coil wound along an axial direction of the camshaft to define a bore into which the camshaft is inserted; and a control unit electrically connected to the detection coil and designed to output a signal based on a change in inductance of the detection coil.

Further, the coil block may include a single coil block and the control unit may include a plurality of control units, the detection coil of the coil block being connected to the control units.

Furthermore, the sensor apparatus may include a hollow box-shaped housing for accommodating the control unit, the housing having an opening; and a cover arranged to cover the opening of the housing, the coil block and the cover being welded to the housing.

With the present invention, it is possible to provide a sensor apparatus capable of accurately detecting the position of a camshaft by reducing the influence of radial misalignment of the camshaft.

BRIEF DESCRIPTION OF THE DRAWINGS

The objects and features of the present invention will become apparent from the following description of a preferred embodiment, given in conjunction with the accompanying drawings, in which.

DETAILED DESCRIPTION OF THE PREFERRED EMBODIMENTS

Hereinafter, one embodiment of the present invention will be described with reference to the accompanying drawings.

A sensor apparatus according to the present embodiment is used to detect the position of a camshaft that can axially move depending on the operating condition of an engine.

Figure 1:
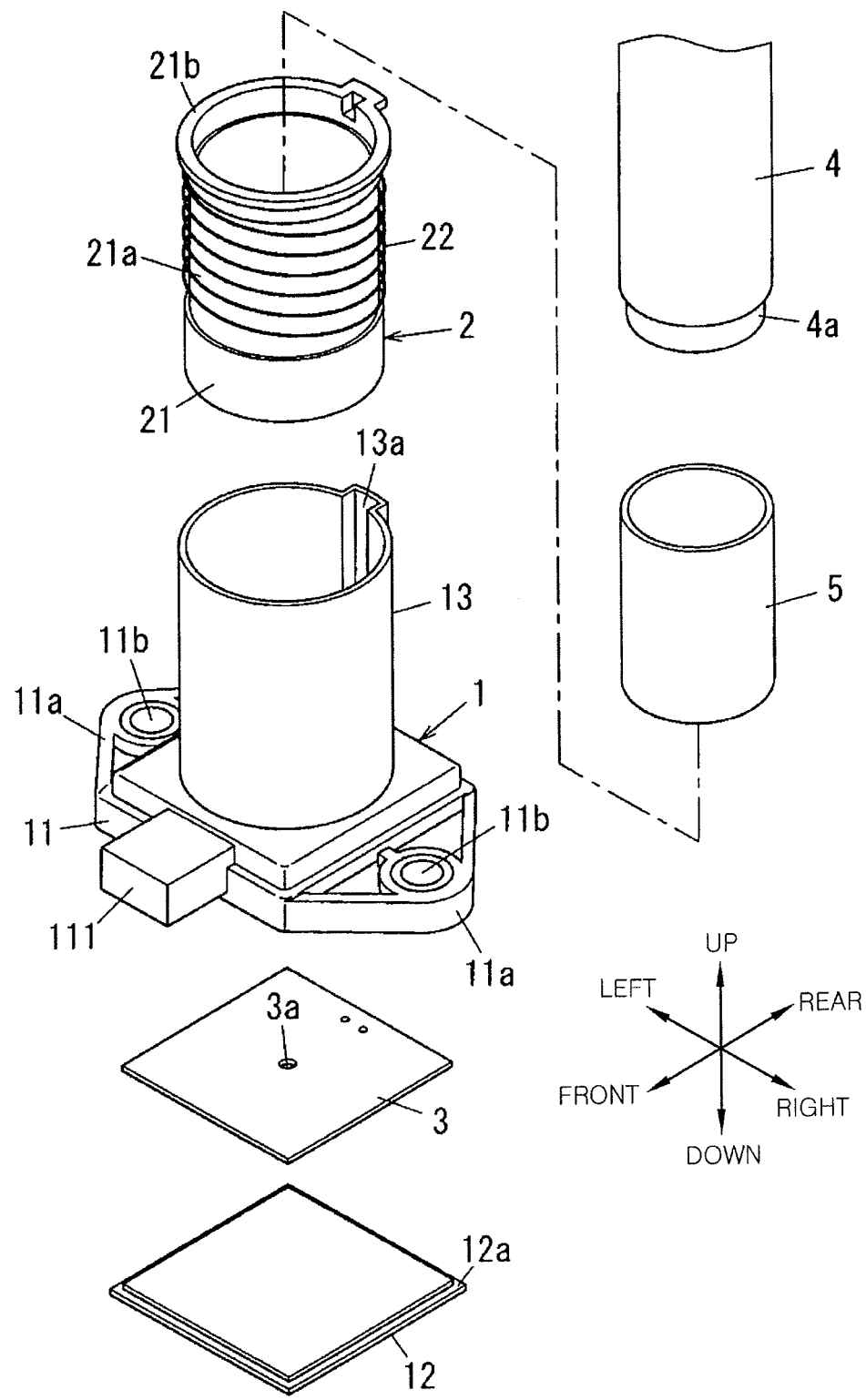
FIG. 1 is an exploded perspective view showing a sensor apparatus in accordance with one embodiment of the present invention.

Referring to FIG. 1, the sensor apparatus of the present embodiment includes a coil block 2, a control board 3 and a case 1 for accommodating the coil block 2 and the control board 3. In the following description, an up-down direction, a left-right direction and a front-rear direction orthogonal to both directions will be defined on the basis of the directions shown in FIG. 1.

The case 1 includes a hollow box-shaped case body 11 with an open lower surface, a case cover 12 arranged to cover the lower surface of the case body 11 and a generally cylindrical receiving body 13 arranged upright on the upper surface of the case body 11.

The case body 11 is formed into a generally rectangular hollow box-shape and is provided with flange portions 11a of generally triangular plate shape protruding from the left and right side surfaces of the case body 11. Insertion holes 11b extending in the up-down direction are formed in the flange portions 11a. The case 1 is threadedly fixed to an installation surface (not shown) by screws (not shown) passing through the insertion holes 11b.

Figure 2:
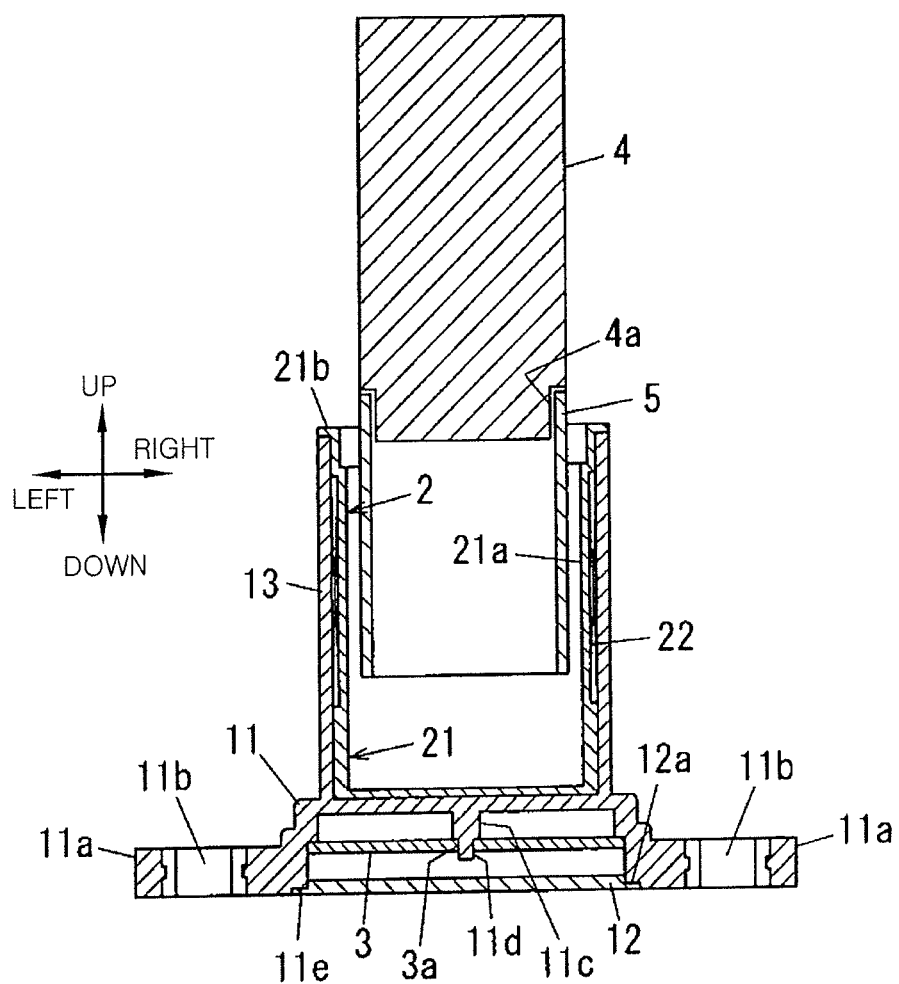
FIG. 2 is a section view of the sensor apparatus shown in FIG. 1.

As shown in FIG. 2, a cylindrical columnar protrusion 11c is formed substantially at the center of the upper surface of the case body 11 to extend downwards within the case body 11. A cylindrical columnar projection 11d having a diameter smaller than that of the protrusion 11c protrudes from the tip end surface of the protrusion 11c.

A rectangular box-shaped connector coupling portion 111 is integrally formed with the front surface of the case body 11. The connector coupling portion 111 has a recess (not shown) formed on one surface thereof. Contact terminals (not shown) to be electrically connected to the control board 3 are arranged side by side within the recess.

The case cover 12 is formed into a rectangular plate shape and has a shoulder portion 12a formed in the peripheral edge area of the upper surface of the case cover 12. After the control board 3 is accommodated within the case body 11, the case cover 12 is attached to the case body 11 to cover the opening of the latter. In this regard, the case body 11 has a step portion 11e formed in the peripheral edge area of the opening. The shoulder 12a of the case cover 12 is fitted to the step portion 11e of the case body 11. Then, the case body 11 and the case cover 12 are fixed together by laser welding. This makes it possible to prevent water or dirt from infiltrating into the case body 11 through the opening of the case body 11.

The receiving body 13 is formed into a generally cylindrical shape with an upper surface thereof opened. The receiving body 13 is arranged upright on the upper surface of the case body 11. A portion of the circumferential wall of the receiving body 13 protrudes outwards over an extent from one end to the other end (namely, from the upper end to the lower end in FIG. 1), thereby defining an axially-extending engagement groove 13a on the inner circumferential surface of the receiving body 13.

The coil block 2 includes a generally cylindrical coil bobbin 21 made of synthetic resin and a detection coil 22 wound around the outer circumferential surface of the coil bobbin 21.

The coil bobbin 21 is formed into a generally cylindrical shape with one end surface thereof opened. A radially-depressed coil winding portion 21a is formed over a specified axial extent of the outer circumferential surface of the coil bobbin 21 to extend along the full circumference of the coil bobbin 21. A flange portion 21b extends outwards from the peripheral edge (the upper end in FIG. 1) of the opening of the coil bobbin 21.

The coil block 2 is inserted into the receiving body 13 at the bottom surface side of the coil bobbin 21. The coil bobbin 21 can be inserted to a position where the lower surface of the flange portion 21b makes contact with the upper end of the receiving body 13, during which time an engagement protrusion (not shown) formed on the outer circumferential surface of the coil bobbin 21 makes sliding movement along the engagement groove 13a of the receiving body 13. Thereafter, the flange portion 21d is laser-welded to the receiving body 13, as a result of which the coil block 2 is fixed to the case 1. This makes it possible to prevent water from infiltrating into a gap between the coil block 2 and the receiving body 13 and into the case body 11, thereby providing a water-proof structure for protection of the detection coil 22 and the control board 3.

The control board 3, which includes a printed board of rectangular plate shape and circuit elements mounted to the printed board, is arranged within the case body 11. In this regard, the control board 3 has an insertion hole 3a formed substantially at the center thereof. The control board 3 is positioned with respect to the case body 11 by inserting the projection 11d of the case body 11 into the insertion hole 3a of the control board 3. The control board 3 is electrically connected to the end portions of the detection coil 22 through, e.g., lead lines.

The sensor apparatus of the present embodiment configured as above is arranged such that the axis of a cylindrical columnar camshaft 4 and the axis of the coil bobbin 21 of the coil block 2 exists on the same line. In this regard, a step portion 4a is formed in the peripheral area of the tip end of the camshaft 4. The step portion 4a is fitted to one end of a bore of an aluminum pipe 5. As the camshaft 4 moves in the axial direction, the axial insertion length of the aluminum pipe 5 with respect to the bore of the coil bobbin 21 is changed, consequently changing the inductance of the detection coil 22. While the aluminum pipe 5 coupled to the camshaft 4 is inserted into the coil bobbin 21 in the present embodiment, the camshaft 4 may be directly inserted into the coil bobbin 21.

The control board 3 detects the change in inductance and generates a position detection signal indicating the position of the camshaft 4 based on the inductance change. The position detection signal is outputted to a control unit (not shown) such as an engine control unit (ECU) or the like.

As described above, the sensor apparatus of the present embodiment is configured to detect the axial position of the camshaft 4 based on the axial insertion length of the aluminum pipe 5 with respect to the coil bobbin 21, the aluminum pipe 5 axially moving together with the camshaft 4. Since the axial insertion length of the aluminum pipe 5 is not changed even when the camshaft 4 is misaligned in the radial direction, the sensor apparatus of the present embodiment can accurately detect the position of the camshaft 4 by reducing the influence of radial misalignment of the camshaft 4.

While the sensor apparatus of the present embodiment includes a single control board 3, it may be provided with a plurality of control boards 3. In this connection, the control board 3 is designed to output two kinds of position detection signals (a high signal and a low signal) based on the change in inductance of the detection coil 22 which depends on the axial position of the camshaft 4. For example, the sensor apparatus may be provided with two control boards 3, in which case an OR circuit is connected to the output terminals of the control boards 3. With this configuration, even if one of the control boards 3 suffers from trouble and does not output a high signal, the other control board 3 can act as a backup circuit and can output a correct position detection signal.

The backup method that makes use of a plurality of control boards 3 may be realized by other configurations than the OR circuit configuration. Such a backup method is well-known in the art and will not be described in detail.

While the invention has been shown and described with respect to the embodiment, it will be understood by those skilled in the art that various changes and modifications may be made without departing from the scope of the invention as defined in the following claims.

What is claimed is:

1. A sensor apparatus for detecting a position of an axially movable camshaft, comprising:
    a coil block including a coil bobbin into which the camshaft is movably inserted along an axial direction of the camshaft and a detection coil wound around an outer circumferential surface of the coil bobbin along the axial direction of the camshaft;
    a receiving body accommodating therein the coil block; and
    one or more control units, each of which is electrically connected to the detection coil and designed to output a detection signal of the position of the cam shaft based on a change in inductance of the detection coil,
    wherein the coil block further includes a flange portion extending outwards from a peripheral edge of one end of the coil bobbin and the flange portion is sealed to a peripheral edge of one end of the receiving body to thereby prevent water from infiltrating into a gap between the coil block and the receiving body.

2. The apparatus of claim 1, wherein the number of the one or more control units is at least two, and the detection coil is connected to each of the at least two control units so that the position of the camshaft is detected by using the detection signal outputted from at least one of the at least two control units.

3. The apparatus of claim 1, further comprising:
    a hollow box-shaped housing accommodating the one or more control units, the housing having an opening; and
    a cover arranged to cover the opening of the housing,
    wherein the coil block and the cover are welded to the housing to thereby provide a water-proof structure for protecting the detection coil and the one or more control units.

4. The apparatus of claim 2, further comprising:
    a hollow box-shaped housing accommodating the at least two control units, the housing having an opening; and
    a cover arranged to cover the opening of the housing,
    wherein the coil block and the cover are welded to the housing to thereby provide a water-proof structure for protecting the detection coil and the at least two control units.

5. The apparatus of claim 1, wherein the receiving body has an engagement groove extending along the axial direction of the camshaft, and
    wherein the coil bobbin has an engagement protrusion formed on the outer circumferential surface of the coil bobbin so that the engagement protrusion is engaged with the engagement groove.

6. The apparatus of claim 1, wherein the flange portion is sealed to the peripheral edge of the one end of the receiving body by welding.

* * * * *